(12) United States Patent
Crossgrove et al.

(10) Patent No.: US 8,165,926 B2
(45) Date of Patent: Apr. 24, 2012

(54) METHOD, MEDIUM, AND SYSTEM FOR DETECTING ERRORS IN ITEM REQUESTS

(75) Inventors: James R. Crossgrove, Owego, NY (US); Andrew J. Kofkee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 1645 days.

(21) Appl. No.: 10/688,039

(22) Filed: Oct. 17, 2003

(65) Prior Publication Data

US 2005/0086130 A1    Apr. 21, 2005

(51) Int. Cl.
*G06Q 30/00*    (2012.01)

(52) U.S. Cl. .................................. 705/26.81; 705/26.82

(58) Field of Classification Search .................... 705/26, 705/27, 26.81, 26.82
See application file for complete search history.

(56) References Cited

U.S. PATENT DOCUMENTS

| | | | | |
|---|---|---|---|---|
| 6,138,253 | A * | 10/2000 | Buzsaki | 714/48 |
| 6,415,277 | B1 * | 7/2002 | Klatt et al. | 1/1 |
| 6,606,603 | B1 * | 8/2003 | Joseph et al. | 705/26.8 |
| 7,117,165 | B1 * | 10/2006 | Adams et al. | 705/26.4 |
| 7,139,731 | B1 * | 11/2006 | Alvin | 705/35 |
| 7,624,045 | B2 * | 11/2009 | Uchida et al. | 705/26.8 |
| 2002/0055878 | A1 * | 5/2002 | Burton et al. | 705/26 |
| 2002/0095342 | A1 * | 7/2002 | Feldman et al. | 705/15 |
| 2002/0184237 | A1 * | 12/2002 | McFeely | 707/104.1 |
| 2005/0065859 | A1 * | 3/2005 | Uchida et al. | 705/26 |
| 2009/0292719 | A1 * | 11/2009 | Lachtarnik et al. | 707/102 |

OTHER PUBLICATIONS

Dictionary.com, "Queue", Accessed on Aug. 20, 2009 http://dictionary.reference.com/browse/queue.*
http://iceb.nccu.edu.tw/proceedings/APDSI/2002/papers/paper89.pdf.*

* cited by examiner

*Primary Examiner* — Matthew Zimmerman
(74) *Attorney, Agent, or Firm* — William Schiesser; Hoffman Warnick LLC

(57) ABSTRACT

Under the present invention, user-initiated and system-initiated item request are received by a "purchasing/requisition application" or the like. Upon receipt, a set of tables are populated using data within the requests. Thereafter the item requests are processed with the system-initiated item requests typically being processed in batch. Should an error arise in processing one of the system-initiated item requests (e.g., due to lack of supplier/approver, or a data level error within the request), the failed system-initiated request is placed into a failed request queue. Upon demand, an administrator can be presented with a view of the failed request queue so that he/she can see all requests that have failed. The system could also allow the administrator to view and edit the data corresponding to any of the user-initiated or system-initiated requests. Any views that are presented to the administrator are presented within a single browser window for GWA compliance.

18 Claims, 3 Drawing Sheets

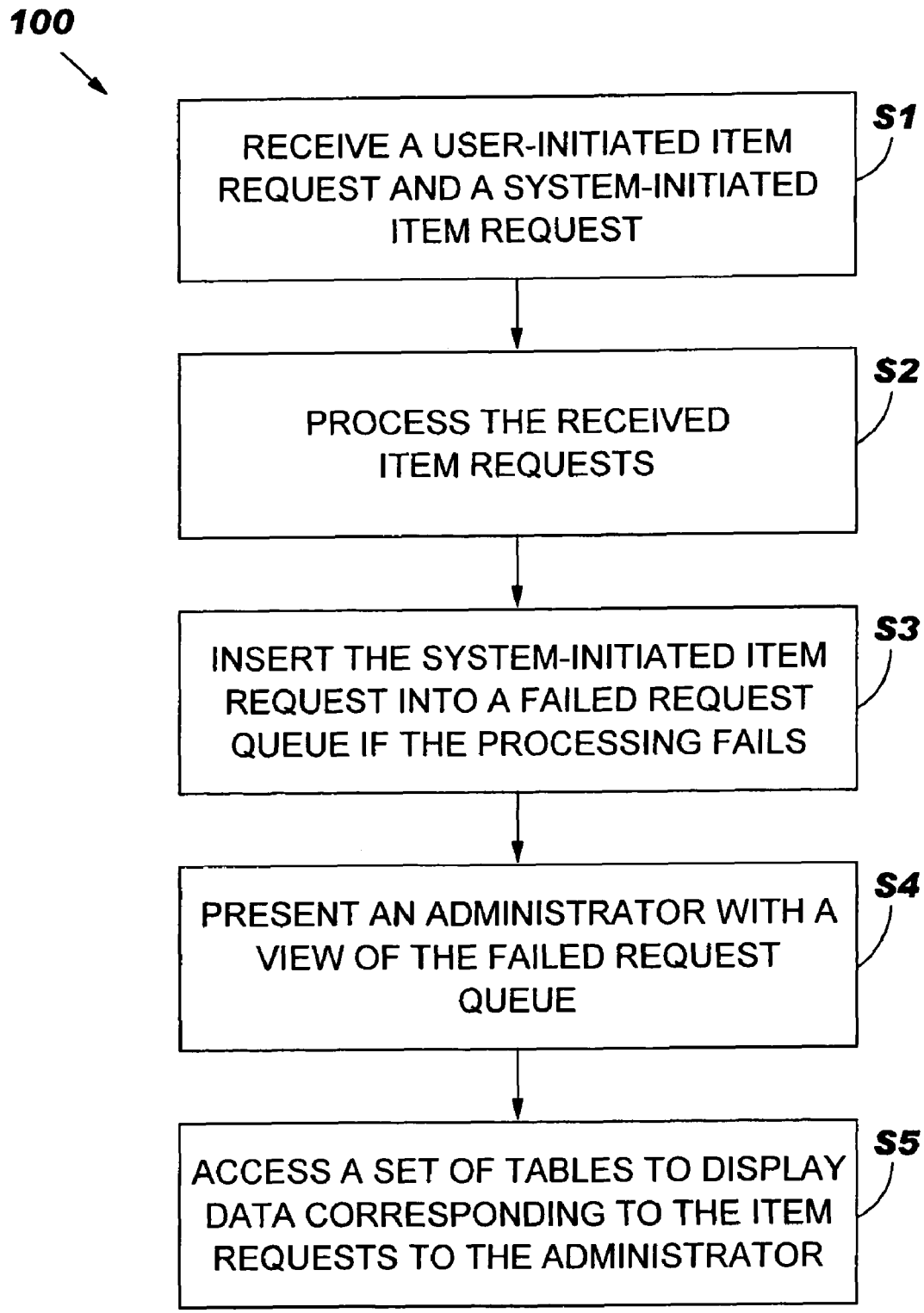

METHOD, MEDIUM, AND SYSTEM FOR DETECTING ERRORS IN ITEM REQUESTS

FIELD OF THE INVENTION

The present invention generally relates to a system, method and program product for maintaining item requests. Specifically, the present invention provides an improved way for performing maintenance on item requests received from individual users or external systems.

BACKGROUND OF THE INVENTION

In business, efficiency has become an essential component of success. Part of being efficient involves obtaining necessary goods/services (e.g., items) as they are needed in an expedient manner. To this extent, as businesses become more computer dependent, many orders/requisitions (i.e., item requests) are made using one or more computer-based applications. Currently, there are typically at least two ways in which an item can be requested. In one scenario, an employee or group of employees will manually issue requests for items that are necessary to perform job functions. Such requests can be for items ranging from stationery and business cards to actual goods (e.g., chemicals) needed for production. In another scenario, an external, non-human system will issue item requests as items are needed. For example, an inventory management system could automatically keep track of items as they are consumed by the organization. As the existing supply of a particular item nears depletion, the inventory management system could issue an item request to replenish the supply.

In handling item requests, an organization will typically implement one or more applications that can receive the item requests from the users and/or the external systems, and interface with the appropriate back-end systems and suppliers to actually obtain the requested items. Unfortunately, as is well known, the processing of item requests is not always flawless. For example, part of processing an item request could involve assigning an approver and particular supplier thereto. In so doing, an appropriate approver or supplier might not be available or known to the system. Moreover, even if an approver and supplier is available, the item request itself could contain data level errors. For example a user issuing an item request could make an inadvertent typographical error when generating the request. This could cause the subsequent processing of that request to fail.

Heretofore, attempts have been made to provide maintenance of item requests received from users or external systems. Unfortunately, existing tools fail to accommodate features such as suppliers suggested by the users for fulfilling the requests, or business justifications offered by the users for approving the requests. Moreover, the existing tools are not generally GWA compliant because they require that multiple browser windows be opened when accessing certain parts of the GUI.

In view of the foregoing, there exists a need for an improved system, method and program product for maintaining item requests. To this extent, a need exists for a system that is capable of handling both user-initiated and system-initiated item requests. A further need exists for the system to be able to accommodate suppliers and/or business justifications for the item requests offered by the users. Another need exists for the system to insert any failed system-initiated item request into a failed request queue, and present a view of the queue to an administrator. An additional need exists for an administrator to be able to view and possibly change data corresponding to the item requests. Still yet, a need exists for the system to provide a GUI in which multiple browser windows are not needed.

SUMMARY OF THE INVENTION

In general, the present invention provides a system, method and program product for maintaining item requests. Specifically, under the present invention, user-initiated and system-initiated item requests are received by a "purchasing/requisition application" or the like. Upon receipt, a set of tables are populated using data within the requests. Two such tables that are provided under the present invention include a "party table" and a "header level text table." These tables can populated with any suppliers suggested by the users for fulfilling the user-initiated item requests, and any business justifications provided by the users for approving the user-initiated item requests (respectively). Regardless, all item requests are thereafter processed, with the system-initiated item requests typically being processed in batch. In processing the item requests, approvers and suppliers are assigned thereto. Should an error arise in processing one of the system-initiated item requests (e.g., due to lack of supplier/approver, or a data level error within the request), the failed system-initiated request is placed into a failed request queue. Upon demand, an administrator can be presented with a view of the failed request queue. The system also allows the administrator to view the data corresponding to any of the user-initiated or system-initiated requests. Further, if the administrator is a "global administrator," he/she can edit the data. In any event, any views that are presented to the administrator are presented within a single browser window. Thus, the present invention complies with GWA guidelines by not spawning multiple windows to accommodate different features of the GUI.

A first aspect of the present invention provides a system for maintaining item requests, comprising: a queue system for inserting any failed system-initiated item requests into a failed request queue; a view presentation system for presenting an administrator with a view of the failed request queue; a data presentation system for displaying data corresponding to system-initiated item requests and user-initiated item requests to an administrator, wherein the data presentation system accesses a set of tables to obtain the data, and wherein the set of tables includes a party table that identifies suppliers suggested by users issuing the user-initiated item requests for fulfilling the user-initiated item requests; and a data edit system for allowing the administrator to edit the data corresponding to the system-initiated item requests and the user-initiated item requests.

A second aspect of the present invention provides a method for maintaining item requests, comprising: receiving a user-initiated item request and a system-initiated item request, wherein the user-initiated item request identifies a supplier for fulfilling the user-initiated item request; processing the user-initiated item request and the system-initiated item request, wherein the system-initiated item request is processed in batch with other system-initiated item requests; inserting the system-initiated item request into a failed request queue if the processing of the system-initiated item request fails; presenting an administrator with a view of the failed request queue upon request; and accessing a set of tables to display data corresponding to the system-initiated item request and the user-initiated item request to the administrator, wherein the set of tables accessed includes a party table that identifies the supplier.

A third aspect of the present invention provides a program product stored on a recordable medium for maintaining item requests, which when executed, comprises: program code for inserting any failed system-initiated item requests into a failed request queue; program code for presenting an administrator with a view of the failed request queue; program code for displaying data corresponding to system-initiated item requests and user-initiated item requests to an administrator, wherein the data presentation system accesses a set of tables to obtain the data, and wherein the set of tables includes a party table that identifies suppliers suggested by users issuing the user-initiated item requests for fulfilling the user-initiated item requests; and program code for allowing the administrator to edit the data corresponding to the system-initiated item requests and the user-initiated item requests.

Therefore, the present invention provides a system, method and program product for maintaining item requests.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram, according to the present invention.

Is noted that the drawings of the invention are not to scale. The drawings are intended to depict only typical aspects of the invention, and therefore should not be considered as limiting the scope of the invention. In the drawings, like numbering represents like elements between the drawings.

BEST MODE FOR CARRYING OUT THE INVENTION

As indicated above, the present invention provides a system, method and program product for maintaining item requests. Specifically, under the present invention, user-initiated and system-initiated item requests are received by a "purchasing/requisition application" or the like. Upon receipt, a set of tables are populated using data within the requests. Two such tables that are provided under the present invention include a "party table" and a "header level text table." These tables could be populated with information such as any suppliers suggested by the users for fulfilling the user-initiated item requests, and any business justifications provided by the users for approving the user-initiated item requests (respectively). Regardless, all item requests are thereafter processed, with the system-initiated item requests typically being processed in batch. In processing the item requests, approvers and suppliers are assigned thereto. Should an error arise in processing one of the system-initiated item requests (e.g., due to lack of supplier/approver, or a data level error within the request), the failed system-initiated request is placed into a failed request queue. Upon demand, an administrator can be presented with a view of the failed request queue. The system also allows the administrator to view the data corresponding to any of the user-initiated or system-initiated requests. Further, if the administrator is a "global administrator," he/she can edit the data. In any event, any views that are presented to the administrator are presented within a single browser window. Thus, the present invention complies with GWA guidelines by not spawning multiple windows to accommodate different features of the GUI.

Figure 1:
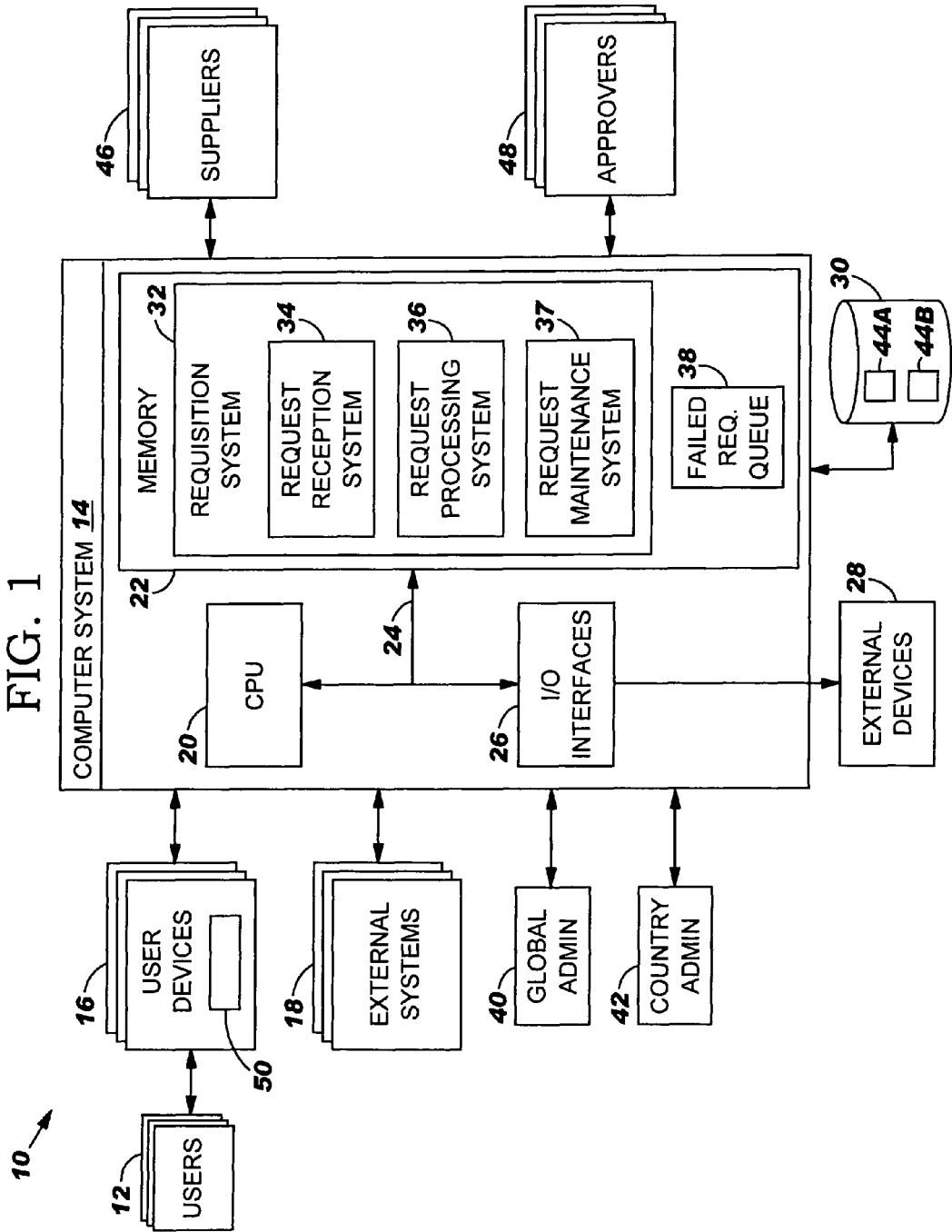
FIG. 1 depicts a system for maintaining item requests, according to the present invention.

It should be understood in advance that as used herein, the term "item" is intended to refer to goods or services. Further, as will be described further below, the present invention can accommodate different levels of administrators. For example, under the present invention, a "country administrator" could have a certain set of permissions, while a "global administrator" could have a greater set of permissions. Referring now to FIG. 1 a system 10 for maintaining item requests is shown. In general, computer system 14 will receive item requests issued by individual or groups of users 12 and/or from one or more external systems 18. To this extent, the term "user-issued item request" refers to that issued by a user 12, while "system-issued item request" refers to that issued by an external system 18. External systems 18 are intended to represent computer hardware, software or a combination thereof that issues item requests without human or user intervention. For example, one of external systems 18 could be an inventory management system that automatically issues item requests as supplies near depletion. User devices 16 are intended to represent any type of computerized devices through which users 12 can communicate with computer system 14. For example, user devices 16 could comprise personal computing devices such as a laptop, personal computer, hand held device, cellular phone, pager device, etc. Moreover, user devices 16 typically communicate with computer system 14 via a direct hardwired connection (e.g., serial port), or via an addressable connection in a client-server environment that may utilize any combination of wireline and/or wireless transmission methods. In the case of the latter, communication could occur via a public network such as the Internet, or a private network such as a local area network (LAN), wide area network (WAN), a virtual private network (VPN), etc. To this extent, the server and client may utilize conventional network connectivity, such as Token Ring, Ethernet, WiFi or other conventional communications standards. Moreover, connectivity could be provided by conventional TCP/IP sockets-based protocol. In this instance, the client would utilize an Internet service provider to establish connectivity to the server. It should be understood, however, that the architecture shown in FIG. 1 is intended to be illustrative only and that other variations are possible. For example, users 12 could access computer system 14 directly, without their own individual "devices." Further, although not shown, administrators such as global administrator 40 and control administrator 42 could access computer system 14 using separate computerized "administrator devices" in a fashion similar to users 12 (i.e., as opposed to accessing computer system 14 directly as depicted).

As depicted, computer system 14 generally comprises central processing unit (CPU) 20, memory 22, bus 24, input/output (I/O) interfaces 26, external devices/resources 28 and storage unit 30. CPU 20 may comprise a single processing unit, or be distributed across one or more processing units in one or more locations, e.g., on a client and computer system. Memory 22 may comprise any known type of data storage and/or transmission media, including magnetic media, optical media, random access memory (RAM), read-only memory (ROM), a data cache, etc. Moreover, similar to CPU 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LCD screen, hand-held device, keyboard, mouse, voice recognition system, speech output system, printer, monitor/display, facsimile, pager, etc. Bus 24 provides a communication link between each of the components in computer system 14 and likewise may comprise any known type of transmission link, including electrical, optical, wireless, etc.

Storage unit 30 can be any system (e.g., database) capable of providing storage for information such as tables of data under the present invention. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 14. Further, it is understood that user devices 16 will typically include the same components (e.g., CPU, memory, etc.) as shown and described with reference to computer system 14. These components have not been separately shown and discussed for brevity.

Shown in memory 22 of computer system 14 is request maintenance system 37. In general, request maintenance system 37 can be part of or at least work in conjunction with requisition system 32. Requisition system 32 is intended to represent an application through which items can be ordered from suppliers 46. It should be appreciated that other systems and components not shown in FIG. 1 will be used to handle item requests and order items. For example, a typical requisition system generally includes a front-end system through which users 12 and/or external systems 18 could issue item requests, and one or more back-end systems for connecting computer system 14 and the front-end system with suppliers 46. Such systems should be understood to be incorporated as part of requisition system 32.

In any event, users 12 and/or external systems 18 will issue item requests. Users 12 will typically use a browser 50 on a user device 16 to interface with requisition system 32. As user-issued and system-issued item requests are issued, they will be received by request reception system 34 and subsequently processed by request processing system 36. Upon receiving the item requests, request reception system 34 will populate a set of tables in storage unit 30 with the data therein. Under the present invention at least two new tables are provided and are populated with data from the user-issued item requests. Namely, a party table 44A entitled ReqCat.TReq_Spec_Text and a header level text table 44B entitled ReqCat.TReqItem_Party. Party table 44A provides users 12 with the capability to suggest requisition contact information such as potential suppliers for fulfilling their item requests. Header level text table 44B can be used to store any type of header level text provided by the users 12 such as any business justifications for approving their item requests. To this extent, the former could be useful in readily identifying ideal suppliers 46 for fulfilling the item requests, while the latter could be useful in efficiently gaining approval for the item requests from approvers 48. Regardless, this data as provided by users 12 in issuing the item requests can be stored in tables 44A-B.

Under the present invention, in addition to accommodating suggested requisition contact information and header level text, several new fields of data within the item requests can be accommodated. Specifically, the present invention can accommodate the following fields that were not previously accommodated:

TREQ.REQ_OFFSHORE_CD (pertinent for tax implications)
TREQ.reqappr_mgrlev_cd (for denoting the level of a manager)
TREQ_PROCESS_HIST.REQIT_NUM (for denoting the requisition item number)
TREQ_PROCESS_HIST.REQPHST_ACTION_CD (for denoting an action code representing a description of the event being recorded)
TREQ_PROCESS_HIST.REQPHST_OLDVAL_TXT (for denoting any old data of an event being recorded)
TREQ_PROCESS_HIST.REQPHST_NEWVAL_TXT (for denoting any old data of an event being recorded)
TREQ_PROCESS_HIST.REQPHST_ACTGRP_CD (for denoting a group code pertaining to the action code)
TREQ_ITEM.CUOM_CD (for denoting a unit of measure used by the system)

In accommodating these new fields of data under the present invention, corresponding new fields have been added to the set of tables in storage unit 30.

Once the set of tables has been populated, request processing system 36 will process the item requests. Specifically, request processing system 36 will process the requests by assigning suppliers 46 and approvers 48 thereto. In a typical embodiment, the system-issued item requests are processed in batch. In any event, as indicated above, processing of the item requests occasionally fails due to the failure to located appropriate approvers 48 and/or suppliers 46, or due to data level problems in the item requests. Under the present invention, request maintenance system 37 provides an improved way to maintain and troubleshoot the item requests.

Figure 2:
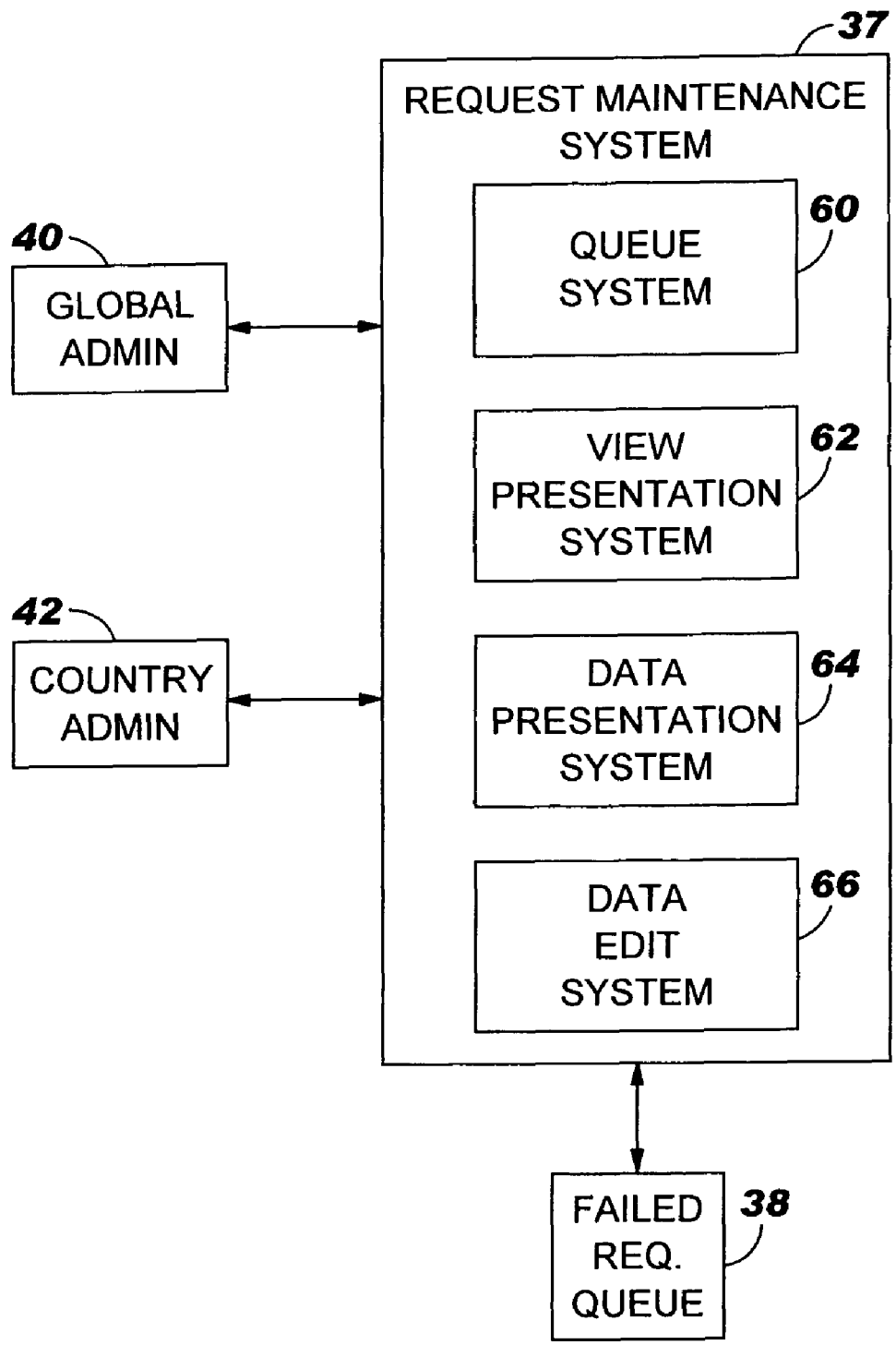
FIG. 2 depicts the maintenance system of FIG. 1 in greater detail.

Referring now to FIGS. 1 and 2 collectively, the operation of request maintenance system 37 will described in greater detail. As depicted, request maintenance system 37 includes queue system 60, view presentation system 62, data presentation system 64 and data edit system 66. When one of the system-issued item requests fails, queue system 60 will insert it into a failed request queue 38 along with other failed system-issued item requests. At any time, global administrator 40 or country administrator 42 can request to view failed request queue 38. Specifically, using the GUI provided by request maintenance system 37, either administrator 40 or 42 can select a link, button or the like. Upon such a selection, view presentation system 62 will present a view of failed request queue 38. Since the present invention is compliant with GWA guidelines, the view of failed request queue 38 is presented without the need to spawn a separate window. Specifically, the GUI through which administrators 40 and 42 interact with request maintenance system 37 will display the view. Accordingly, if the GUI is provided to administrators 40 and 42 via browsers (e.g., such as that which would be loaded on separate "administrator devices" which are not shown), the view of failed request queue 38 will be presented without opening a new browser window. In any event, the view of failed request queue 38 allows administrators to see the precise item requests that failed, the reason(s) why, and take any necessary action.

Data presentation system 64 allows administrators 40 and 42 to view data corresponding to all item requests (i.e., user-initiated as well as system-initiated). Specifically, as is known, not all data underlying an item request is readily available to most users 12 or other systems. In fact, most such data is not pertinent when issuing an item request. However, such data could be extremely valuable in troubleshooting a problem with an item request. Accordingly, data presentation system 64 will access the set of tables in storage unit 30 (including the party table 44A and the header level text table 44B), and display most, if not all, of the data for item requests upon request by administrators 40 or 42. Similar to the view of failed request queue 38, the data could be displayed in a view that is presented without opening additional windows in the GUI. Thus, all views and information provided under the present invention can be viewed within a single interface or browser window.

In a typical embodiment, data edit system 66 provides global administrator 40 with the capability to edit the displayed data. Data editing capabilities are especially useful when troubleshooting a failed item request. To this extent, under the present invention, different levels of permissions could be assigned to different administrators. For example, although country administrator 42 can view data corresponding to item requests, he/she might not have the capability to edit the data. Regardless, any such permissions can be maintained in storage unit 30 and accessed as needed by request maintenance system 37.

As can be seen, the present invention not only accommodates several new data fields and data tables, but it also achieves GWA compliance by allowing all views to be spawned in a single interface window.

Referring now to FIG. 3, a method flow diagram 100 according to the present invention is shown. As shown, first step S1 is to receive a user-initiated item request and a system-initiated item request. As indicated above, the user-initiated item request can identify a supplier for fulfilling the item request and/or a business justification for approving the item request. Second step S2 is to process the user-initiated item request and the system-initiated item request, with the system-initiated item request being processed in batch with other system-initiated item requests. Third step S3 is to insert the system-initiated item request into a failed request queue if the processing thereof fails. Fourth step S4 is to present an administrator with a view of the failed request queue upon request/demand. Fifth step S5 is to access a set of tables to display data corresponding to the system-initiated item request and the user-initiated item request to the administrator. As also described above, the set of tables accessed includes a party table and a header level text table.

It should be understood that the present invention can be realized in hardware, software, or a combination of hardware and software. Any kind of computer system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the administrators 40 and 42 shown herein are intended to be illustrative only. Other types/levels of administrators could be accommodated under the present invention. In addition, although the population of the set of tables with data has been described as being performed by request reception system 34, it could actually be performed by any system such as request processing system 36.

We claim:

1. A computer-implemented method for maintaining item requests, executed on a computer device, the method comprising:
   receiving, on the computer device, a user-initiated item request and a system-initiated item request, wherein the user-initiated item request identifies a supplier for fulfilling the user-initiated item request;
   processing, on the computer device, the user-initiated item request and the system-initiated item request, wherein the system-initiated item request is processed differently from user-initiated item requests and wherein the system-initiated item request is processed in batch with other system-initiated item requests and wherein the processing comprises attempting to assign an approver and a supplier to each of the user-initiated item request and the system-initiated item request, the approver being distinct from the user initiating the item request;
   detecting an error in the system-initiated request based on a lack of locating a supplier or an approver during the processing;
   inserting, on the computer device, the system-initiated item request into a failed request queue in response to detecting the error in the processing;
   presenting, on the computer device, an administrator with a view of data corresponding to the failed request queue upon request, the view including an identification of a system-initiated item request that failed and a reason for the failure; and
   accessing, on the computer device, a set of tables to display data, distinct from the failed request queue, corresponding to all of the system-initiated item request and all of the user-initiated item request to the administrator, wherein the set of tables accessed includes a party table that identifies the supplier, the displayed data including at least one identified supplier,
   wherein the view of the failed request queue and the data are presented separately to the administrator in separate views within a single window without opening multiple windows.

2. The method of claim 1, wherein the administrator is a global administrator.

3. The method of claim 2, further comprising providing the global administrator with the capability to edit displayed data.

4. The method of claim 1, wherein the administrator is a country administrator.

5. The method of claim 1, wherein the user-initiated item request further includes a business justification for approving the user-initiated item request, and wherein the set of tables accessed to display the data further includes a header level text table that identifies the business justifications, the displayed data further including at least one identified business justification.

6. The method of claim 1, wherein the system-initiated item requests and the user-initiated item requests do not include a designated supplier or a designated approver, and the user-initiated item requests may include a suggested supplier.

7. A system for maintaining item requests, comprising:
at least one computer device configured to:
- receive, on the computer device, a user-initiated item request and a system-initiated item request, wherein the user-initiated item request identifies a supplier for fulfilling the user-initiated item request;
- process, on the computer device, the user-initiated item request and the system-initiated item request, wherein the system-initiated item request is processed differently from user-initiated item requests and wherein the system-initiated item request is processed in batch with other system-initiated item requests and wherein the processing comprises attempting to assign an approver and a supplier to each of the user-initiated item request and the system-initiated item request, the approver being distinct from the user initiating the item request;
- detect an error in the system-initiated request based on a lack of locating a supplier or an approver during the processing;
- insert, on the computer device, the system-initiated item request into a failed request queue in response to detecting the error in the processing;
- present, on the computer device, an administrator with a view of data corresponding to the failed request queue upon request, the view including an identification of a system-initiated item request that failed and a reason for the failure; and
- access, on the computer device, a set of tables to display data, distinct from the failed request queue, corresponding to all of the system-initiated item request and all of the user-initiated item request to the administrator, wherein the set of tables accessed includes a party table that identifies the supplier, the displayed data including at least one identified supplier, wherein the view of the failed request queue and the data are presented separately to the administrator in separate views within a single window without opening multiple windows.

8. The system of claim 7, further comprising a set of tables including a header level text table that identifies business justifications set forth by the users for approving the user-initiated item requests.

9. The system of claim 7, further comprising a request reception system configured to receive the user-initiated item requests from the users and the system-initiated item requests from at least one external system, wherein the request reception system further populates the set of tables using data from the user-initiated item requests and the system-initiated item requests.

10. The system of claim 7, wherein the administrator is a global administrator.

11. The system of claim 7, wherein the view presentation system is further configured to provide a country administrator with the view of the failed request queue, and wherein the data presentation system further displays the data corresponding to the system-initiated item requests and the user-initiated item requests to the country administrator.

12. The system of claim 7, wherein the system-initiated item requests and the user-initiated item requests do not include a designated supplier or a designated approver, and the user-initiated item requests may include a suggested supplier.

13. A program product stored on a non-transitory computer readable medium for maintaining item requests, wherein the program product comprises executable instructions which when executed by at least one computing device causes the at least one computing device to:
- receive, on the computer device, a user-initiated item request and a system-initiated item request, wherein the user-initiated item request identifies a supplier for fulfilling the user-initiated item request;
- process, on the computer device, the user-initiated item request and the system-initiated item request, wherein the system-initiated item request is processed differently from user-initiated item requests and wherein the system-initiated item request is processed in batch with other system-initiated item requests and wherein the processing comprises attempting to assign an approver and a supplier to each of the user-initiated item request and the system-initiated item request, the approver being distinct from the user initiating the item request;
- detect an error in the system-initiated request based on a lack of locating a supplier or an approver during the processing;
- insert, on the computer device, the system-initiated item request into a failed request queue in response to detecting the error in the processing;
- present, on the computer device, an administrator with a view of data corresponding to the failed request queue upon request, the view including an identification of a system-initiated item request that failed and a reason for the failure; and
- access, on the computer device, a set of tables to display data, distinct from the failed request queue, corresponding to all of the system-initiated item request and all of the user-initiated item request to the administrator, wherein the set of tables accessed includes a party table that identifies the supplier, the displayed data including at least one identified supplier, wherein the view of the failed request queue and the data are presented separately to the administrator in separate views within a single window without opening multiple windows.

14. The program product of claim 13, further comprising a set of tables including a header level text table that identifies business justifications set forth by the users for approving the user-initiated item requests.

15. The program product of claim 13, further comprising program code for receiving the user-initiated item requests from the users and the system-initiated item requests from at least one external system, wherein the program code for receiving further populates a set of tables using data from the user-initiated item requests and the system-initiated item requests.

16. The program product of claim 13, wherein the administrator is a global administrator.

17. The program product of claim 13, wherein the program code for presenting further provides a country administrator with the view of the failed request queue, and wherein the program code for displaying further displays the data corresponding to the system-initiated item requests and the user-initiated item requests to the country administrator.

18. The program product of claim 13, wherein the system-initiated item requests and the user-initiated item requests do not include a designated supplier or a designated approver, and the user-initiated item requests may include a suggested supplier.

* * * * *